US007453346B2

(12) United States Patent
Buccinna et al.

(10) Patent No.: US 7,453,346 B2
(45) Date of Patent: Nov. 18, 2008

(54) KEY FOB WITH DETENT MECHANISM

(75) Inventors: Frank Buccinna, Livonia, MI (US); John Burca, Rochester Hills, MI (US); Stephen M. Doyle, Clinton Township, MI (US); Leonard E. Pagano, Warren, MI (US)

(73) Assignee: Lear Corporation, Southfield, MI (US)

(*) Notice: Subject to any disclaimer, the term of this patent is extended or adjusted under 35 U.S.C. 154(b) by 221 days.

(21) Appl. No.: 11/028,095

(22) Filed: Jan. 3, 2005

(65) Prior Publication Data

US 2006/0145810 A1 Jul. 6, 2006

(51) Int. Cl.
*H04Q 1/00* (2006.01)

(52) U.S. Cl. ..................................................... 340/5.72

(58) Field of Classification Search ................ 340/5.72, 340/5.64; 70/395; 206/305, 320; 361/727, 361/686

See application file for complete search history.

(56) References Cited

U.S. PATENT DOCUMENTS

| | | | | |
|---|---|---|---|---|
| 5,388,691 | A | 2/1995 | White | |
| 5,850,754 | A | 12/1998 | Dobbins | |
| 6,533,111 | B1 | 3/2003 | Harden | |
| 6,669,017 | B2 * | 12/2003 | Linihan | 206/305 |
| 6,948,614 | B1 * | 9/2005 | Hall et al. | 206/305 |
| 7,142,413 | B2 * | 11/2006 | Sugimoto et al. | 361/679 |
| 2002/0008610 | A1 * | 1/2002 | Peterson | 340/5.64 |
| 2004/0033788 | A1 | 2/2004 | Price | |
| 2005/0012594 | A1 | 1/2005 | Shim | |

FOREIGN PATENT DOCUMENTS

WO WO 02/09132 A1 1/2002

* cited by examiner

*Primary Examiner*—Brian Zimmerman
*Assistant Examiner*—Nabil H Syed
(74) *Attorney, Agent, or Firm*—MacMillan, Sobanski & Todd, LLC

(57) ABSTRACT

A key fob for housing at least one electrical component for wireless communication with a vehicular system includes a main body having at least one actuator button. The actuator button is operable to control an electrical component for wireless communication with a vehicular system. The main body includes a first detent mechanism. The key fob further includes a cap moveably connected to the main body. The cap is moveable between a closed position and an open position such that in the closed position the cap at least partially covers the actuator button and such that in the open position the cap at least partially exposes the actuator button. The cap includes a second detent mechanism. The second detent mechanism is operable to cooperate with the first detent mechanism to lock the cap relative to the main body in one of the closed position and the open position.

9 Claims, 4 Drawing Sheets

KEY FOB WITH DETENT MECHANISM

BACKGROUND OF THE INVENTION

This invention relates to key fobs.

Keyless remote entry has become prevalent in its inclusion in new vehicle accessories. More specifically, the use of key fob type mechanisms which allow for the locking and unlocking of vehicle door lock systems, the opening of truck latch mechanisms and the setting and unsetting of alarm systems have become commonplace in new vehicle accessories. High end, as well as low end, vehicles are including the above noted functions as well as other functions in standard accessory packages. In this manner, the importance of the protection of remote keyless entry key fobs is rising.

As the public begins to rely more on more on these key fobs systems, it becomes imperative to protect and preserve the electrical circuitry of these devices. The introduction of moisture either by rain, mist, or inadvertent dropping in water puddles near the vehicle inevitably occurs in common use of the key fobs. The introduction of foreign particle such as dust, dirt and sand also occurs through common use and over time begins to degrade if not completely hinder the normal operation of the key fob. In addition, as the key fob is often, if not entirely kept along with the car keys and other house keys, the common use also entails inadvertent dropping, knocking, banging, and hitting of the key fob against hard objects. This continuous physical shock to the key fob over time begins to degrade if not completely hinder the normal operation of the key fob.

Consequently, a need exists for a protective cover for the remote keyless entry key fob. A system that will allow full implementation of all the communication buttons on the system while still providing protection for the key from the above noted hazardous conditions will greatly improve the longevity of the key fob.

BRIEF SUMMARY OF THE INVENTION

This invention relates in general to key fob and more specifically to a key fob with a moveable cap.

In one preferred embodiment of the present invention, a key fob for housing at least one electrical component for wireless communication with a vehicular system includes a main body having at least one actuator button. The actuator button is operable to control an electrical component for wireless communication with a vehicular system. The main body includes a first detent mechanism. The key fob further includes a cap moveably connected to the main body. The cap is moveable between a closed position and an open position such that in the closed position the cap at least partially covers the actuator button and such that in the open position the cap at least partially exposes the actuator button. The cap includes a second detent mechanism. The second detent mechanism is operable to cooperate with the first detent mechanism to lock the cap relative to the main body in one of the closed position and the open position.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
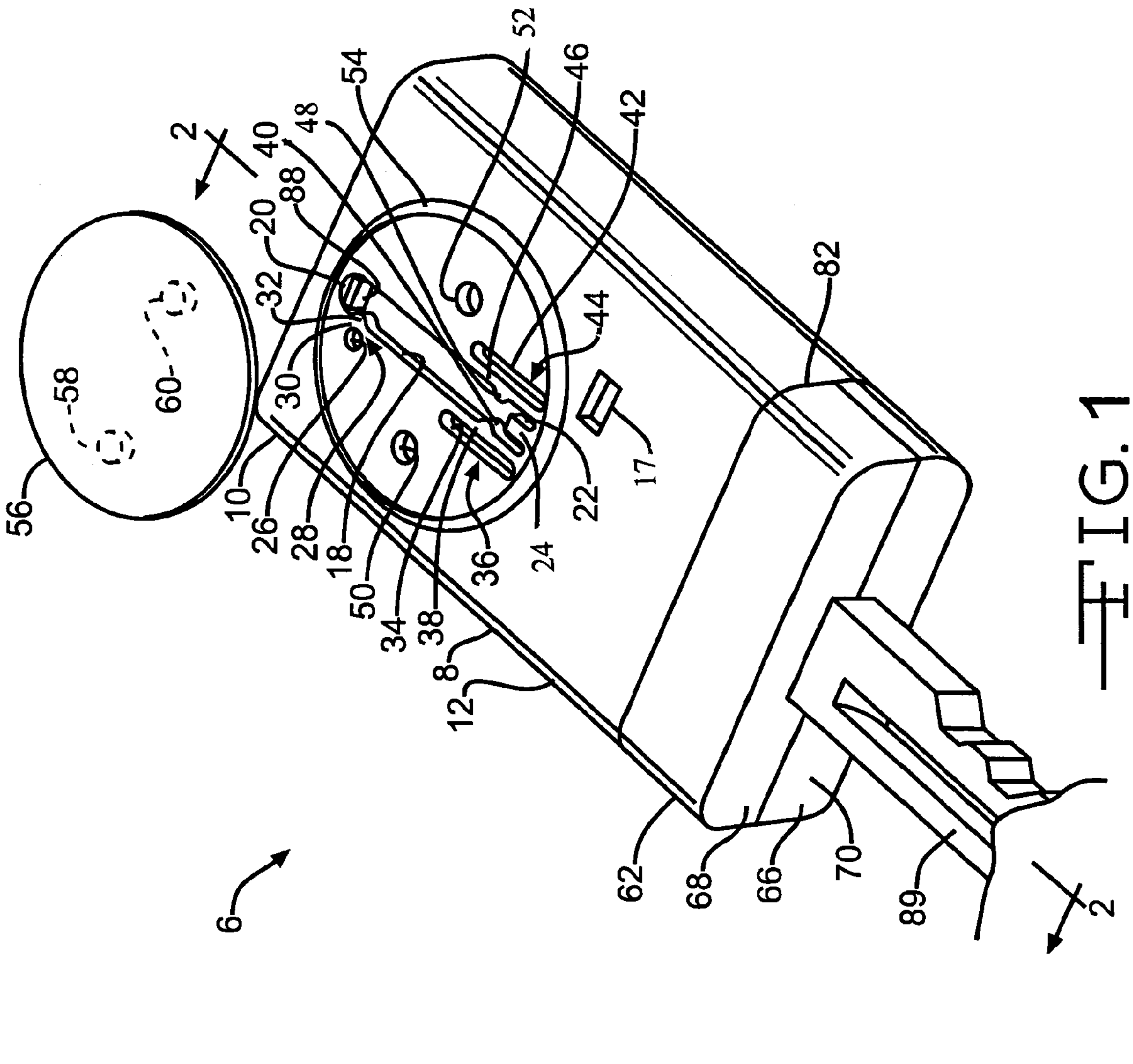
FIG. 1 is a perspective view, partially exploded, of a key fob in accordance with a preferred embodiment of the present invention in a closed position.

Referring now to the drawings, there is illustrated in FIGS. 1-4, a key fob 6 in accordance with a preferred embodiment of the present invention. The key fob 6 includes a cap 8. The cap 8 has a first end 10 and a second end 12. Generally, the cap 8 forms a cavity that is closed at the first cap end 10 and open at the second cap end 12.

Figure 4:
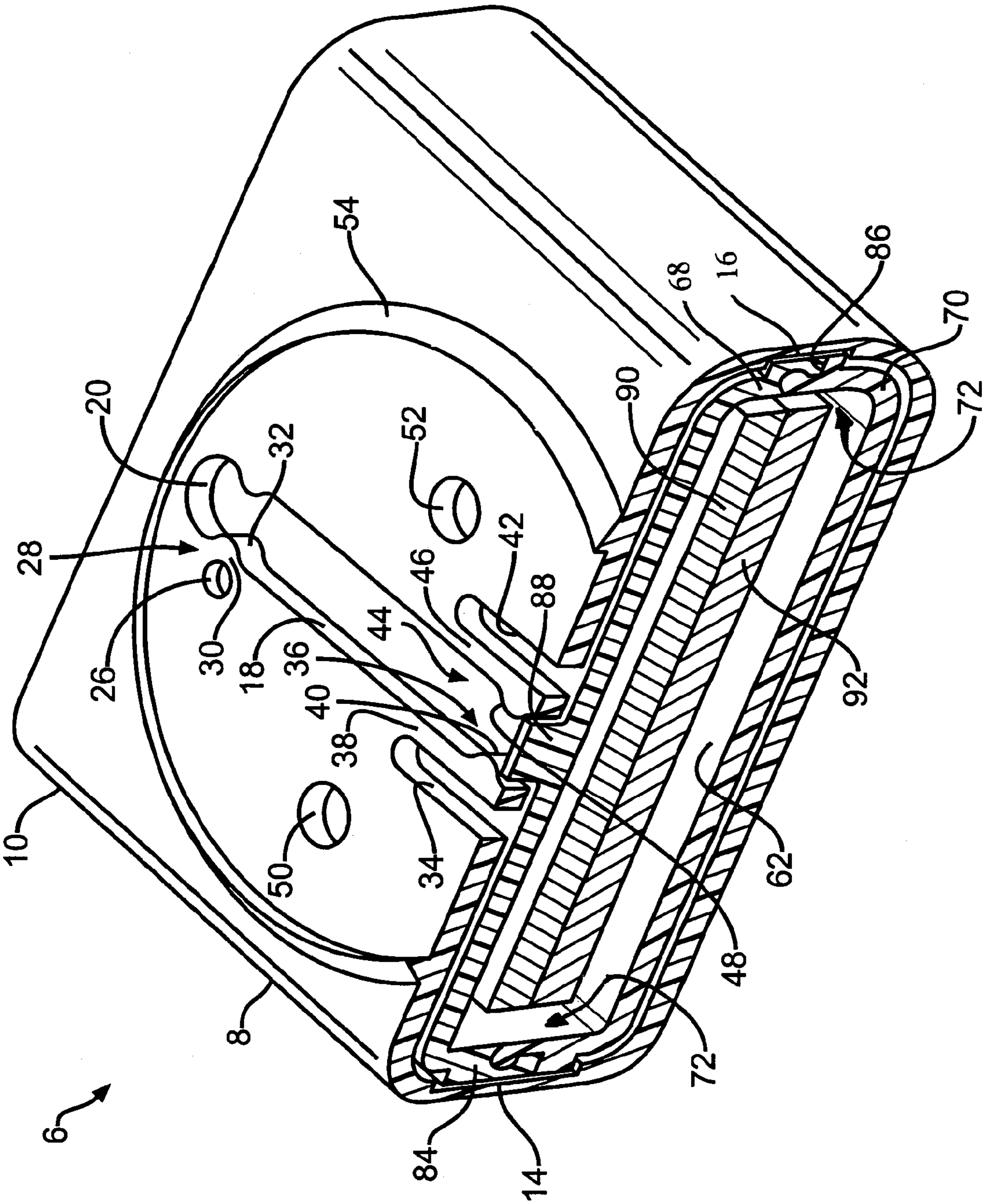
FIG. 4 is a partial cross-sectional perspective view of the key fob of FIG. 3 taken along line 4-4.

Preferably, as best shown in FIG. 4, the cap 8 has a pair of longitudinally extending tracks 14 and 16. The tracks 14 and 16 are formed in opposite surfaces of the cavity of the cap 8 and extend from approximately the first cap end 10 to the second cap end 12. The purpose of the tracks 14 and 16 will be explained below.

The cap 8 includes as optional cap window 17 that extends through the cap 8 and is in communication with the cavity formed therein. The purpose of the cap window 17 will be explained below.

The cap 8 preferably includes a generally longitudinally extending slot 18. The slot 18 has a first end 20 near the first cap end 10. The first slot end 20 preferably forms a smooth semi-circular shape. However, it must be understood that the first slot end 20 may be any suitable shape. The slot 18 has a second end 22 toward the second cap end 12. The second slot end 22 preferably includes a stop 24 protruding therefrom in a generally longitudinal direction along the slot 18. However, it must be understood that the second slot end 22 need not include the stop 24 and may be any suitable shape. The purpose of the stop 24 will be discussed below.

The cap 8 preferably includes a generally circular first hollow 26 formed near the first slot end 20. As shown, the first hollow 26 extends though a surface of the cap 8 to be in communication with the cavity therein. However, it must be understood that the first hollow 26 need not extend through the cap surface, the first hollow 26 may, for example, be a depression in the cap surface.

The cap 8 preferably includes a first detent mechanism, indicated generally at 28. The first detent mechanism 28 includes a generally longitudinally extending first rib 30 defined by the slot 18 and the first hollow 26. A first protrusion 32 extends from the first rib 30 into the slot 18. The purpose of the first detent mechanism 28 will be discussed below.

The cap 8 preferably includes a generally oblong second hollow 34 formed near the second slot end 22. The cap 8 preferably includes a second detent mechanism, indicated generally at 36. The second detent mechanism 36 includes a generally longitudinally extending second rib 38 defined by the slot 18 and the second hollow 34. A second protrusion 40 extends from the second rib 38 into the slot 18. The purpose of the second detent mechanism 36 will be discussed below.

The cap 8 preferably includes a generally oblong third hollow 42 formed near the second slot end 22 opposite the second hollow 34. The cap 8 preferably includes a third detent mechanism, indicated generally at 44. The third detent mechanism 44 includes a generally longitudinally extending third rib 46 defined by the slot 18 and the third hollow 42. A third protrusion 48 extends from the third rib 46 into the slot 18. The purpose of the third detent mechanism 44 will be discussed below.

The cap optionally includes a pair of bores 50 and 52 on opposite sides of the slot 18. The cap also optionally includes a generally circular flange 54 formed in the surface of the cap 12 and surrounding the first, second, and third detent mechanism 28, 36, and 44.

The key fob 6 optionally includes a cover plate 56, as shown removed in FIG. 1. The cover plate 56 preferably includes a pair of pins 58 and 60 that correspond to and cooperate with the bores 50 and 52 to secure the plate 56 to the cap 8. Alternatively, the plate 56 may be secured to the cap 8 by adhesive, or by any suitable fastening arrangement. The flange 54 servers to protect the secured plate 56 from lateral or shear forces across the surface of the cap 6 that may damage the fastening arrangement between the plate 56 and the cap 8. The optional cover plate 56 thus protects the first, second, and third detent mechanisms 28, 36, and 44.

The key fob 6 includes a main body 62. The main body 62 has a first end 64 and a second end 66. The main body 62 preferably has an upper portion 68 and a lower portion 70. The portions 68 and 70 are joined by a traditional tongue and groove lock, as generally indicated at 72, to form an electrical housing.

Figure 3:
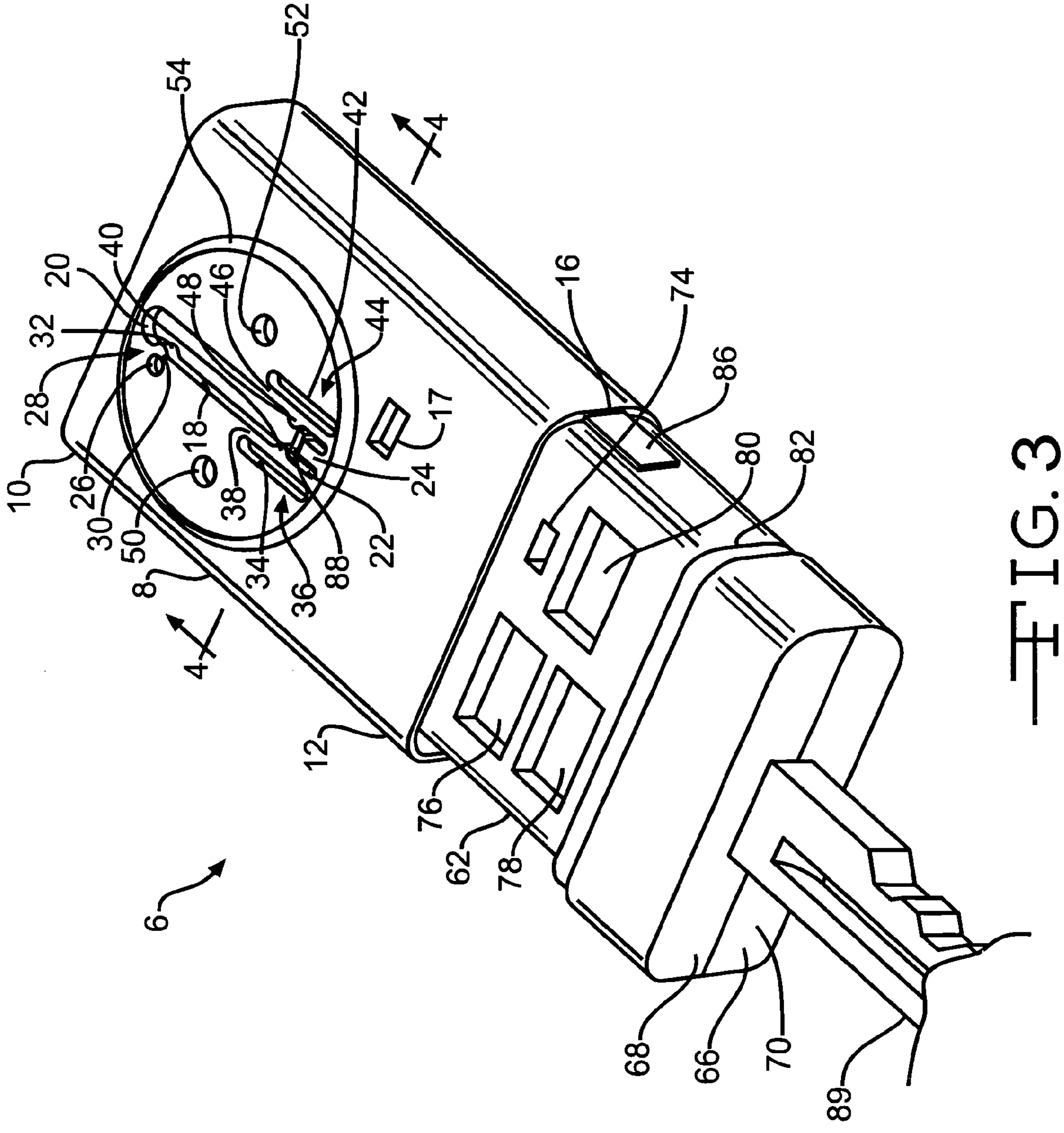
FIG. 3 is a perspective view of the key fob of FIG. 1 in an open position.

The main body 62 includes an optional body window 74, as shown in FIG. 3, that extends through the main body and is in communication with electrical housing formed therein. The purpose of the body window 74 will be explained below.

As shown in FIG. 3, the main body 62 includes first, second, and third actuator buttons 76, 78, and 80. It must be understood that the main body 62 may include any suitable number of actuator buttons. The actuator buttons 76, 78, and 80 are shown as being rectangular depressions formed the upper portion 68 with a flexible material defining the bottom of the impressions. It must be understood, however, that the actuator buttons 76, 78, and 80 may have any suitable shape, such as round or triangular or any other shape, and may take any suitable form, such as protrusions or any other suitable form, and may include any suitable material, such as a rubber or plastic or any other suitable material. Further, the actuator buttons 76, 78, and 80 may optionally be formed integrally or separately. The purpose for the buttons 76, 78, and 80 will be discussed below.

The main body 62 preferably includes a ridge 82. The ridge 82 defines a transition between a reduced body portion toward the first main body end 64 and an increased body portion toward the second main body end 66. The main body 62 further preferably includes a pair of rails 84 and 86, as best shown in FIG. 4. The rails 84 and 86 cooperate with the tracks 14 and 16 to allow slidable movement between the cap 8 and the main body 62. The cap 8 is preferably moveable between a closed position, as shown in FIG. 1, and an open position, as shown in FIG. 3. In the closed position, the cap 8 at least partially covers at least one actuator button 76, 78, and 80. In the open position, at least one actuator button 76, 78, and 80 is at least partially exposed.

While the tracks 14 and 16 have been described as having been formed in the cap 8 and the rails 84 and 86 have been described as having been formed in the main body 62, it must be understood that alternatively tracks may be formed in the main body 62 and rails may formed in the cap 8. Further while the preferred embodiment has been described as having track and rail engagements that slidably cooperate to allow the main body 62 and the cap 8 to move relative one another, it must be understood that the cap 8 and the main body 62 may have any suitable engagement, such as a pivoting pin engagement, a swinging hinge engagement, or any other suitable engagement.

The main body 62, preferably includes a fourth detent mechanism in the form of a Peg 88. The peg 88 extends outwardly from the surface of the upper portion 68. The peg 88 is disposed in the slot 18. The purpose of the peg 88 will be discussed below.

The key fob 6 includes an optional key 89. The key 89 is secured between the upper portion 68 and the lower portion 70. Preferably, the key 89 is a conventional key for ignition of an automotive vehicle. It must be understood, however, that the key 89 may be a key with anti-theft chip technology, or an other suitable key. Further, it must be understood that the key fob 6 need not include the key 89.

Figure 2:
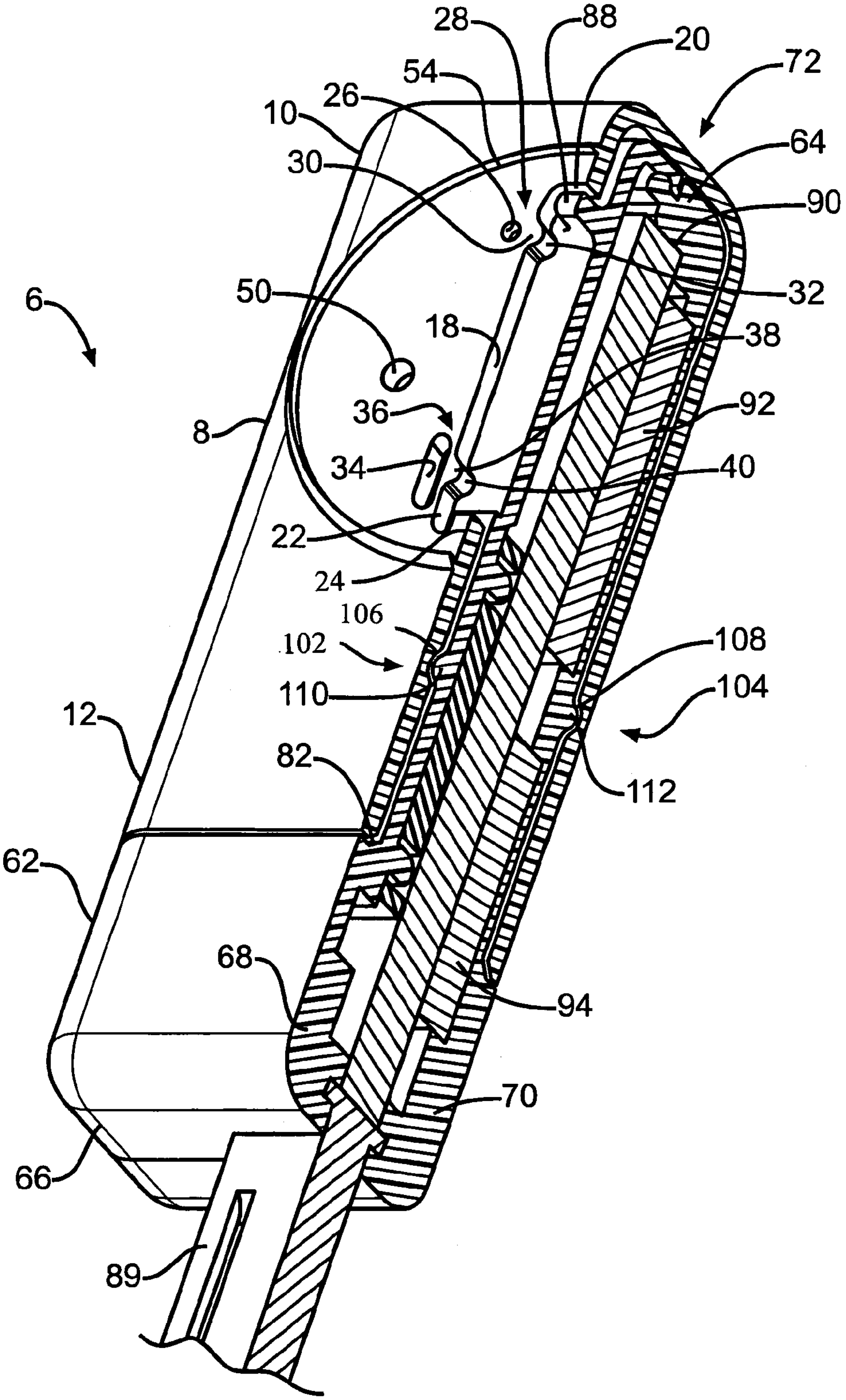
FIG. 2 is partial cross-sectional perspective view of the key fob of FIG. 1 taken along line 2-2.

As best shown in FIG. 2, in the preferred embodiment, the key fob 6 further includes electrical components for wireless communication with a vehicular system, in the form of a printed circuit board (PCB) 90, an antenna 92, and a battery 94. For example, the electrical components 90, 92, and 94 may be suitable to communicate with a vehicle passive entry system. The electrical components 90, 92, and 94 are disposed in the electrical housing in the main body formed by the upper portion 68 and the lower portion 70. Preferably, the electrical components 90, 92, and 94 are operably connected to at least one of the actuator buttons 76, 78, and 80 for controlling the electrical components 90, 92, and 94, for example, for activating and deactivating a vehicular remote keyless entry system. It must be understood that while the key fob 6 has been described as including at least one actuator button, it must be understood that the term actuator button is intended to include any suitable electrical actuator, such as an optical sensor, thermal sensor, or any other suitable actuator. An optional light emitting diode (LED), not shown, may be included in the key fob 6. The LED may indicate the status of the electronic components 90, 92, and 94 by transmitting light through the body window 74 and/or the cap window 17.

In operation, in the preferred embodiment, the first detent mechanism 28 and the first slot end 20 cooperate with the peg 88 to lock the cap 8 relative to the main body 62 in the closed position, as shown in FIG. 1. To open the key fob 6, pressure is applied to move the cap 8 away from the second body end 66. As the tracks 14 and 16 slide along the rails 84 and 86, the peg 88 moves along the slot 18. As the peg 88 encounters the protrusion 32 increased pressure is applied until sufficient to deflect the first rib 30 toward the first hollow 26. Once past the first detent mechanism 28, the peg 88 is free to travel along the slot 18 until the peg 88 encounters the second protrusion 40 and the third protrusion 48. As the peg 88 encounters the second detent mechanism 36 and the third detent mechanism 44 increased pressure is applied until sufficient to deflect the second rib 38 toward the second hollow 34 and the third rib 46 toward the third hollow 42. Once the peg 88 is past the second and third detent mechanisms, the second and third detent mechanisms and the stop 24 cooperate with the peg 88 to lock the cap 8 relative to the main body 62 in the open position, as shown in FIG. 3. The height of the stop 24 may be adjusted during manufacture to adjust the amount of in the movement of the cap 8 while in the locked open position. The procedure is then reversed to change the key fob 6 from the locked open position to the locked closed position.

While the preferred embodiment has been described as being locked in a fully open or in a fully closed position, it must be understood that the other embodiments of the invention contemplate a key fob that may be locked in any suitable position. Further, while the preferred embodiment has been described as including the hollows 26, 34 and 42, it must be understood that such features need not be included to practice the invention. For example, one embodiment of the present invention contemplated a cap including a portion forming detent mechanisms formed from a resilient, compressible elastomer. Further, while the preferred embodiment has been described as including the rib/protrusion detent mechanisms, it must be understood that the present invention contemplates the inclusion of other detent mechanisms, such as spring ball, bulldog or any other suitable detent mechanisms.

For further example, an alternative embodiment of the present invention includes bump/dimple detent mechanisms as generally indicated at 102 and 104, in FIG. 2. The cap 8 includes an upper dimple 106 and a lower dimple 108 formed on opposite surfaces of the cap cavity. The main body 62 includes upper and lower bumps 110 and 112 corresponding to the dimples 106 and 108. When aligned, as shown in FIG. 2, the dimples 106 and 108 cooperate with the bumps 110 and 112 to lock the fey fob 6 in the closed position.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A key fob comprising:

a main body including a peg;

a cap supported on the main body for sliding movement between a closed position and an opened position, the cap having a slot extending therethrough that defines first and second ends and first and second sides, wherein the peg is received in the slot between the first and second ends thereof and between the first and second sides thereof to limit movement of the cap relative to the main body; and a wireless communication device including an actuator that is supported on the main body, wherein the cap at least partially covers the actuator when located in the closed position and at least partially exposes the actuator when located in the opened position.

2. The key fob defined in claim 1 wherein the cap includes a protrusion that extends into the slot adjacent to the first end thereof and cooperates with the peg to retain the cap in the closed position.

3. The key fob defined in claim 2 wherein the cap includes a hollow that defines a rib that supports the protrusion.

4. The key fob defined in claim 1 wherein the cap includes (1) a first protrusion that extends into the slot adjacent to the first end thereof and cooperates with the peg to retain the cap in the closed position and (2) a second protrusion that extends into the slot adjacent to the second end thereof and cooperates with the peg to retain the cap in the opened position.

5. The key fob defined in claim 4 wherein the cap includes a first hollow that defines a first rib that supports the first protrusion and a second hollow that defines a second rib that supports the second protrusion.

6. The key fob defined in claim 1 wherein the cap includes (1) a first protrusion that extends into the slot adjacent to the first end thereof and cooperates with the peg to retain the cap in the closed position, (2) a second protrusion that extends into the slot adjacent to the second end thereof and cooperates with the peg to retain the cap in the opened position, and (3) a third protrusion that extends into the slot adjacent to the second end thereof and cooperates with the peg to retain the cap in the opened position.

7. The key fob defined in claim 6 wherein the cap includes a first hollow that defines a first rib that supports the first protrusion, a second hollow that defines a second rib that supports the second protrusion, and a third hollow that defines a third rib that supports the third protrusion.

8. The key fob defined in claim 1 wherein the main body includes an outer surface, and wherein the peg extends outwardly from the outer surface.

9. The key fob defined in claim 1 wherein the key fob includes a key.

* * * * *